Nov. 7, 1939.   C. H. WEIDENMIER   2,179,018
FISHING LURE
Filed June 29, 1937
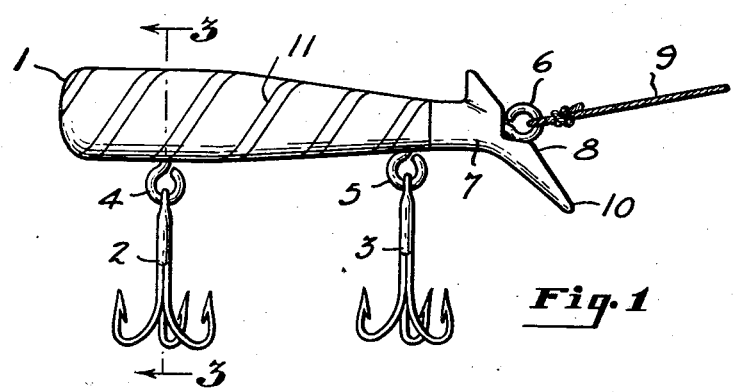
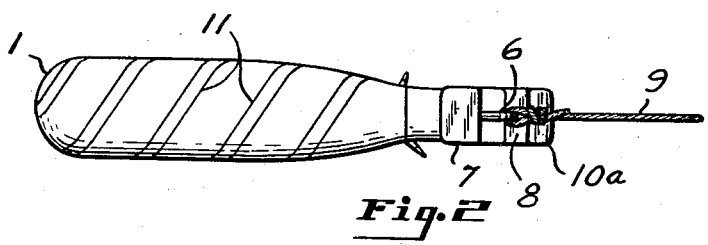
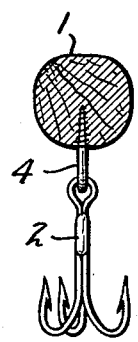
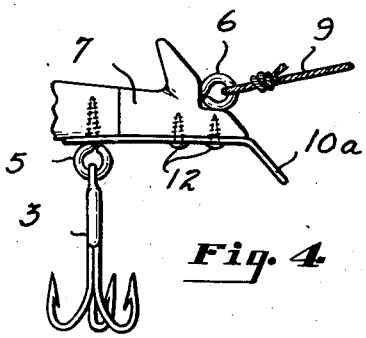
INVENTOR
*Carl H. Weidenmier*
BY
*Edmund J. Te Pas*
his ATTORNEY Patented Nov. 7, 1939

2,179,018

UNITED STATES PATENT OFFICE 2,179,018

FISHING LURE

Carl H. Weidenmier, Berlin Center, Ohio

Application June 29, 1937, Serial No. 150,967

1 Claim. (Cl. 43—46)

This invention relates to artificial bait for the catching of fish and it has for its objects the provision of a fast acting casting lure which is adapted to have a short, choppy, sidewise action in the water somewhat like the swimming movements of a live fish and the provision of a casting lure in which the fisherman can control the level or degree of submersion of the lure by the speed with which the lure is moved through the water.

These and other objects of the invention will become more apparent and better understood after consideration has been given to the following detailed description of the invention taken in connection with the drawing which shows, merely by way of illustration, structure adapted for carrying out the objects of the invention.

In the drawing, Figure 1 is a side elevational view of a fishing lure illustrative of one mode of practicing the invention; Figure 2 is a top plan view of a lure corresponding to the lure shown in Figure 1, except for a slight change in the tip of the head of the lure; Figure 3 is a sectional view taken on line 3—3, Figure 1; and Figure 4 is a side elevational view of the head of the lure shown in Figure 2.

The lure shown in Figure 1 of the drawing comprises a body portion 1 which may be oval-shaped in cross-section with the diameter of the body portion progressively increasing from the front end to the rear end of the lure. The body portion is preferably made of a material which will float in water and because of its shape, the buoyancy is greater at the rear of the lure than it is at the forward end thereof so that when the lure is at rest in the water the head or forward end of the same will sink to a slightly lower level than the rear end.

A pair of gang hooks 2 and 3 are suspended from the underside of the body portion by any suitable means such as threaded eyes 4 and 5 respectively and a threaded eye 6 is provided at the head 7 of the lure for attachment to a fishing line 9. The head 7 is provided with a substantially flat, angularly disposed face 8, the purpose of which will be described in detail presently.

Most of the casting lures which are in use today are of stream-lined configuration similar to the body of a fish, with the front end larger than the rest so that the greatest buoyancy is at or close to the front of the lure. The shape of the casting lure of the present invention is just the reverse of the conventional arrangement and the small end forms the front and the larger end forms the rear of the lure so that the greatest buoyancy is at the rear end of the lure.

In drawing the conventional stream-lined or fish-shaped lure through the water, the tendency of the lure, because of its shape, is to move in a generally straight line with a sort of gliding action whereas the present lure has a choppy, sidewise action somewhat similar to the lateral movements of a metal casting spoon or the movements of a rapidly swimming fish except, of course, that the lure does not rotate or turn over as does a casting spoon. This choppy action is believed to be highly beneficial in a device of the type disclosed as the fish seem to strike better on a fast acting lure than they do on a slower acting lure.

The inclined surface or slope on the head of the lure permits the fisherman to control the depth at which the lure is used. For example; by reeling in the lure slowly, it may be kept close to the surface of the water and when it is reeled in faster, the inclined surface on the head of the lure causes it to run deeper into the water.

The head 7 and body portion 1 of the lure may be painted in different or brightly contrasting colors, and bands 11 may be painted on the body portion of the lure to attract fish. The lure may be made in various sizes and while the action of the different sizes may vary somewhat, they all have the same general and characteristic movements as previously described.

When the body and head of the lure are made from wood, the tip or end portion 10 of the head of the lure is apt to become damaged and broken off in the use of the device and in order to obviate this objection, a modified form of head, such as the one shown in Figures 2 and 4, may be used on the device. In this modification of the invention, the body portion of the lure is substantially the same as for the lure previously described and the head 7 of the lure is provided with a screw-threaded eye 6 for attaching a fishing line 9 to the lure. A forwardly located gang hook 3 is attached to the body of the lure by means of a screw threaded eye 5, as in the case of the lure first described.

The tip or foremost part of the head of the lure in the form of the invention illustrated in Figures 2 and 4, may be formed from a piece of light weight metal 10a, such as aluminum, which is secured to the underside of the lure by any suitable means, such as, screws 12 and this metal part of the lure may be extended rearwardly to a point just beyond the gang hooks 3. By constructing the lure in this manner, there is no danger of breaking off the tip of the head of the lure and at the same time the operation of the lure in use is not changed to any substantial extent.

The foregoing description and the accompanying drawing to which it relates, describes what might be termed the preferred modes of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein.

Having thus described my invention what I claim is:

Artificial fishing bait comprising, a casting lure having an elongated buoyant body portion with an end face sloping downwardly at the front end of the body portion and terminating in vane-like parts projecting laterally a substantial distance both above and below said body portion, said end face being formed in part at least from a metal plate attached to the underside of the body portion and having a downwardly bent end portion projecting from the front end of the body portion, a hook suspended from the underside of said body portion, and means at the forward end of said body portion for attaching the lure to a fishing line.

CARL H. WEIDENMIER.